Aug. 12, 1930.   H. R. MacFADYEN   1,773,050
ELECTRICAL OUTLET
Filed Jan. 2, 1929

INVENTOR
HARRY R. MAC FADYEN
by his attorneys
Howson and Howson

Patented Aug. 12, 1930

1,773,050

UNITED STATES PATENT OFFICE

HARRY R. MacFADYEN, OF HARTFORD, CONNECTICUT, ASSIGNOR, BY MESNE ASSIGNMENTS, TO THE ARROW-HART & HEGEMAN ELECTRIC COMPANY, OF HARTFORD, CONNECTICUT, A CORPORATION OF CONNECTICUT

ELECTRICAL OUTLET

Application filed January 2, 1929. Serial No. 329,825.

This invention relates to electric outlets and more particularly to flush plates therefor such as are used to improve the appearance of the outlet, to cover the cavity in which the electrical apparatus is located and to cover the exposed parts in order that the electrical parts may not become short circuited.

My invention has for an object the forming of an attractive flush plate at a minimum cost.

Another object is to form a flush plate with means for holding the electrical socket formed integral with said plate, thus reducing the number of parts and the number of operations in manufacture and fabrication of the structure.

Other objects will appear as the invention is described in connection with the accompanying drawings, in which.

Figure 1:
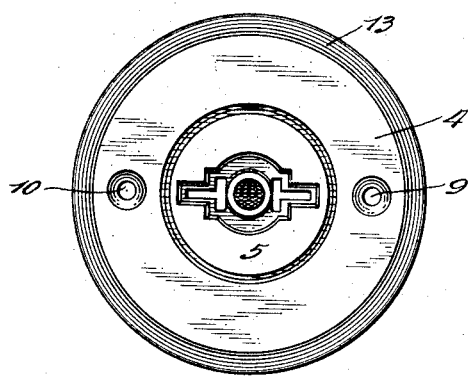
Fig. 1 is a plan view of an outlet embodying my invention.
Figure 2:
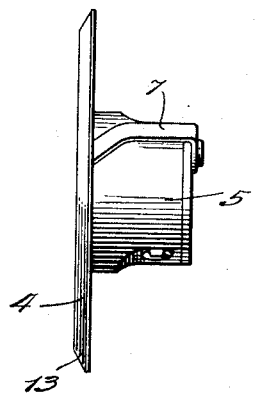
Fig. 2 is a side elevation view of my invention as shown in Fig. 1.
Figure 3:
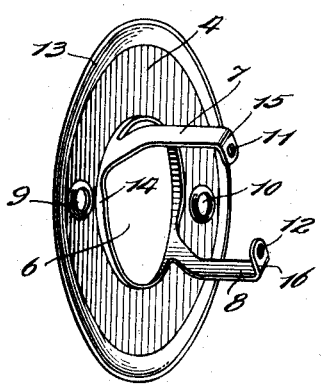
Fig. 3 is a perspective view taken from the rear of my flush plate.
Figure 4:
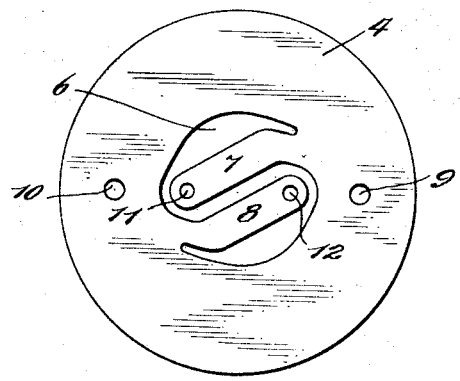
Fig. 4 is a plan view of my flush plate before it is pressed into shape.

In the drawings I have shown a circular flush plate 4 for a conventional cylindrical electric outlet or attachment plug receptacle 5, the plate being usually stamped in the first step of its manufacture from sheet metal with a large central aperture 6 having legs 7, 8 extending therein. The plate also has two small side apertures 9, 10 diametrically opposed to each other near the edge of the plate and the legs each have an aperture 11, 12, punched in their ends in the first step of manufacture of the plate.

In the second step, the legs 7, 8 are bent down through the plate, and flanges 13, 14 are bent around the outside of the plate and the aperture. At the same time the edges of the screw holes 9, 10 are bent down to form a bevel in order that screws subsequently inserted therein may have their heads flush with the top surface of the plate. Also during this step the legs 7, 8, have their ends 15, 16 which, it will be recalled, have the apertures 11, 12 therein, bent inwardly to form a support for the socket receptacle 5. The receptacle may be secured to the legs by screws or rivets molded in the receptacle and the plate may be secured to a base board, wall, outlet box or floor by other screws which may be inserted in screw holes 9, 10. It will be noted that the flange 14 gives stiffness to the plate particularly around the aperture where the plate is most likely to be bent. Due to this flange the plate can be made of thinner material than if, as heretofore, it were made without the flange.

From the foregoing description it will be apparent that I have provided a flush plate which is simple in construction and inexpensive to manufacture and which may be assembled for installation with a conventional plug receptacle very easily without lost time or motion. My invention reduces the time required to make assemble for shipment and install an outlet plug receptacle and its necessary flush plate. I have also reduced the number of parts necessary to be handled in such an installation since prior to my invention the supporting legs for the receptacle were manufactured separately.

While in the example shown my flush plate is round it is apparent that it may be made in any other shape or form, if a suitably shaped punching die is used.

By my process of stamping out the plate and legs integral with each other, in one operation and subsequently, in a second operation, flanging the plate while bending the legs into final shape, I am able to save time, labor and material as well as to make a more desirable construction from a mechanical view point.

I claim—

1. As a new article of manufacture a metal stamping for electrical apparatus comprising a plate having an aperture, legs integral with said plate struck down into said aperture, said legs having inturned ends.

2. An electric outlet comprising in combination a receptacle adapted to receive an attachment plug, a flush plate adapted to support said receptacle, said plate being apertured and having legs integral therewith struck down therefrom with inturned ends to support said receptacle.

3. A flush plate for electrical apparatus comprising an apertured plate with legs struck down from the plate through the aperture, a flange struck down from said plate around said aperture, said aperture and legs being adapted to receive and support an electrical fitting.

4. Electrical apparatus comprising in combination an apertured plate to receive an electrical fitting, a depending flange bent down from said plate and around said aperture, legs struck down from said plate into said aperture, said legs having inturned ends to support the electrical fitting.

In testimony whereof I have signed my name to this specification.

HARRY R. MacFADYEN.